United States Patent
Nory et al.

(10) Patent No.: US 10,609,727 B2
(45) Date of Patent: Mar. 31, 2020

(54) METHOD AND APPARATUS FOR DETERMINING A USER DATA RESOURCE ASSIGNMENT

(71) Applicant: Motorola Mobility LLC, Chicago, IL (US)

(72) Inventors: Ravikiran Nory, Buffalo Grove, IL (US); Vijay Nangia, Woodridge, IL (US); Hossein Bagheri, Urbana, IL (US)

(73) Assignee: Motorola Mobility LLC, Chicago, IL (US)

( * ) Notice: Subject to any disclaimer, the term of this patent is extended or adjusted under 35 U.S.C. 154(b) by 6 days.

(21) Appl. No.: 15/934,983

(22) Filed: Mar. 24, 2018

(65) Prior Publication Data

US 2018/0279354 A1    Sep. 27, 2018

Related U.S. Application Data

(60) Provisional application No. 62/476,700, filed on Mar. 24, 2017.

(51) Int. Cl.
*H04W 72/12* (2009.01)
*H04L 5/00* (2006.01)
*H04W 88/02* (2009.01)
*H04W 72/04* (2009.01)

(52) U.S. Cl.
CPC ....... *H04W 72/1289* (2013.01); *H04L 5/0053* (2013.01); *H04L 5/0064* (2013.01); *H04L 5/0094* (2013.01); *H04W 72/1263* (2013.01); *H04L 5/0048* (2013.01); *H04L 5/0082* (2013.01); *H04W 72/042* (2013.01); *H04W 88/023* (2013.01)

(58) Field of Classification Search
CPC ............... H04W 72/1289; H04W 72/1263
See application file for complete search history.

(56) References Cited

U.S. PATENT DOCUMENTS

| | | | |
|---|---|---|---|
| 2015/0016370 A1* | 1/2015 | Takeda | H04W 72/042 370/329 |
| 2016/0050647 A1* | 2/2016 | Hwang | H04W 72/042 370/329 |
| 2016/0127918 A1* | 5/2016 | Yi | H04W 84/047 370/329 |

(Continued)

OTHER PUBLICATIONS

Palencia, PCT International Application Search Report, International Application No. PCT/US2018/024223, European Patent Office, Rijswijk, NL, dated Jun. 14, 2018.

(Continued)

*Primary Examiner* — Shukri Taha
(74) *Attorney, Agent, or Firm* — Loppnow & Chapa; Matthew C. Loppnow (57) ABSTRACT

A method and apparatus can determine a user data resource assignment in a wireless network. A control channel candidate can be monitored for a control channel. The control channel candidate can correspond to a CCE parameter that is a function of a first RBG size used for user data resource assignments. The control channel can be decoded. A user data resource assignment can be determined based on the decoded control channel. The user data resource assignment can be based on a second RBG size.

17 Claims, 5 Drawing Sheets

(56) References Cited

U.S. PATENT DOCUMENTS

| 2017/0289971 | A1* | 10/2017 | Wu | H04L 1/1671 |
| 2017/0289980 | A1* | 10/2017 | Liu | H04W 72/042 |
| 2018/0368122 | A1* | 12/2018 | Kuchibhotla | H04W 72/085 |

OTHER PUBLICATIONS

Motorola Mobility: "Control signalling for shortened TTI", 3GPP Draft; R1-1612741—SPDCCH V0, 3rd Generation Partnership Project (3GPP), Mobile Competence Centre ; 650, Route Des Lucioles ; F-06921 Sophia-Antipolis Cedex ; France; vol. RAN WG1, no. Reno, USA; Nov. 14, 2016-Nov. 19, 2016, Nov. 13, 2016.
Mediatek Inc: "sPDCCH multiplexing with data", 3GPP Draft; R1-1702656 STTI Multiplexing VI Final, 3rd Generation Partnership Project (3GPP), Mobile Competence Centre ; 650, Route Des Lucioles ; F-06921 Sophia-Antipolis Cedex; France vol. RAN WG1, no. Athens, Greece; Feb. 13, 2017-Feb. 17, 2017, Feb. 12, 2017.

* cited by examiner

METHOD AND APPARATUS FOR DETERMINING A USER DATA RESOURCE ASSIGNMENT

BACKGROUND

1. Field

The present disclosure is directed to a method and apparatus for communicating on a wireless network. More particularly, the present disclosure is directed to a method and apparatus that determine a user data resource assignment in a wireless network.

2. Introduction

Presently, wireless communication devices, such as User Equipment (UE), communicate with other communication devices using wireless signals. For control channel design for Long Term Evolution (LTE) short Physical Downlink Control Channel (sPDCCH) and New Radio Physical Downlink Control Channel (NR-PDCCH), a Physical Downlink Shared Channel (PDSCH) with Resource Elements (REs) used for user data can occupy the same Orthogonal Frequency Division Multiplexing (OFDM) symbol as that of sPDCCH/NR-PDCCH. Unfortunately, this results in unallocable resources in OFDM symbols in which control channels are sent.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Some embodiments can provide a method and apparatus that determine a user data resource assignment in a wireless network. Some embodiments can provide efficient control channel structures that minimize unallocable resources in OFDM symbols in which control channels are sent.

According to a possible embodiment, a control channel candidate can be monitored for a control channel. The control channel candidate can correspond to a Control Channel Element (CCE) parameter that is a function of a first Resource Block Group (RBG) size used for user data resource assignments, such as data resource allocation. The control channel can be decoded. A user data resource assignment can be determined based on the decoded control channel. The user data resource assignment can be based on a second RBG size.

According to another possible embodiment, a control channel candidate for a control channel can be associated with a CCE parameter that is based on a first RBG size used for user data resource assignments. The control channel candidate can be transmitted in the control channel. The control channel candidate can contain control information if the candidate is selected by the network to carry control information to the UE and a control channel for a UE is a control channel candidate containing the control information. User data can be transmitted in resources assigned by a user data resource assignment that is based on the control channel. The user data resource assignment can be a function of a second RBG size.

Figure 1:
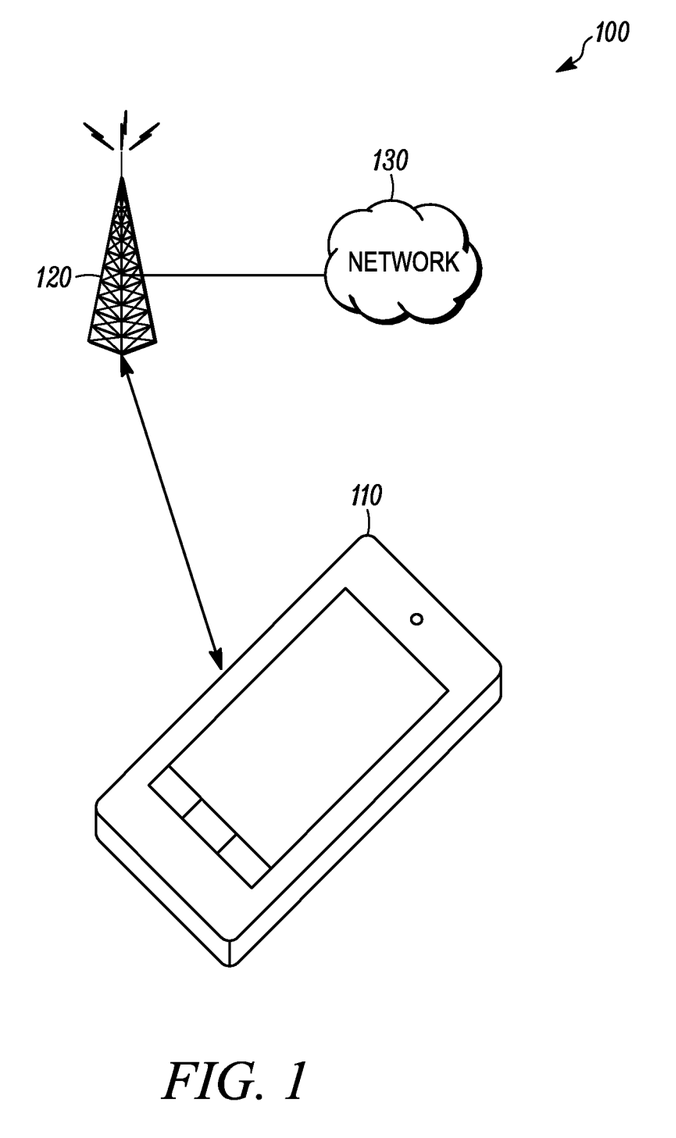
FIG. 1 is an example block diagram of a system according to a possible embodiment.

FIG. 1 is an example block diagram of a system 100 according to a possible embodiment. The system 100 can include a UE 110, a network entity, such as a base station 120, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The network entity 120 can be a wireless wide area network base station, can be a NodeB, an enhanced NodeB (eNB), can be a 5G NodeB (gNB), such as a New Radio (NR) NodeB, can be an unlicensed network base station, can be an access point, can be a Transmission/Reception Point (TRP), can be a base station controller, can be a network controller, can be multiple network entities, and/or any can be other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5G network, a 3rd Generation Partnership Project (3GPP)-based network, a satellite communications network, a high altitude platform network, the Internet, and/or other communications networks.

In operation, the UE 110 can communicate with the network 130 via at least one base station, such as the network entity 120. For example, the UE can send and receive control signals on a control channel and user data signals on a data channel.

A UE can be configured with multiple control resource sets. Each control resource set can correspond to a set of Resource Element Groups (REGs). For example, for NR-PDCCH, each REG can correspond to one Physical Resource Block (PRB) in the frequency domain and one ODFM symbol in time domain. In another example, for sPDCCH, each REG can correspond to one PRB in the frequency domain and two ODFM symbols in the time domain.

Control resource sets can be configured in a UE specific manner and the PRBs and OFDM symbols corresponding to each control resource set can be configured for the UE via higher layers. While the UE can generally expect to be configured with same number of OFDM symbols for all control resource sets configured for the UE, signaling flexibility for number of OFDM symbols can be used if the numerology used for different sets is not same. The numerology can affect subcarrier spacing and slot length, where a smaller numerology value can result in a smaller subcarrier spacing and a longer slot length.

Different alternatives can be possible for mapping of control channel candidates for sPDCCH/NR-PDCCH. A first alternative can be frequency first mapping of REGs to CCEs and frequency first mapping of CCEs to search space control channel candidates. That is, REGs can be first mapped to CCEs in the frequency domain before mapping the REGs to CCEs in the time domain, such as across symbols. Also, CCEs can be mapped to search space control candidates in the frequency domain before mapping the CCEs to search space control candidates in the time domain. A second alternative can be time first mapping of REGs to CCEs and time first mapping of CCEs to search space control channel candidates. A third alternative can be frequency first mapping of REGs to CCEs and time first mapping of CCEs to search control channel space candidates. A fourth alternative can be time first mapping of REGs to CCEs and frequency first mapping of CCEs to search space control channel candidates.

In general, CCEs corresponding to a control channel candidate can be mapped such that they occur within as few OFDM symbols as possible, such as one OFDM symbol. This can be useful from a decoder implementation/latency perspective and can also be potentially useful from a resource utilization perspective. However, in some cases, the frequency span of a control resource set may not be large enough to accommodate all CCEs of a control channel candidate, such as for higher aggregation levels at smaller bandwidths. For such scenarios, the control channel candidate can be constructed using CCEs in multiple OFDM symbols by repeating the CCE locations in later OFDM symbols.

The REG to CCE mapping can be limited in a frequency first manner to limit the control channel candidates to fewer ODFM symbols from decoder implementation/latency perspective. However, if the REGs of a CCE span multiple OFDM symbols, then a DMRS sent in one OFDM symbol can be used for channel estimation in other symbols. This may not be possible if REGs of a CCE are restricted to span only one OFDM symbol, which otherwise can result in a potential increase of pilot overhead. Therefore, while CCE to search space candidate mapping can be frequency first, a decision on time first vs. frequency first mapping of REGs to CCEs, such as between the first alternative and the fourth alternative above, can be taken after DMRS design for NR-PDCCH is finalized.

Transmission of PDCCH in one OFDM symbol can be supported for NR, and NR DMRS can have sufficient density to account for this case. A separate NR DMRS pattern may possibly be used to support a multi-symbol PDDCH. If a separate DMRS pattern is not used, the fourth alternative above may not be used. If separate DMRS patterns are used for one symbol and multi-symbol PDCCH, both the first and the fourth alternatives can be supported.

For LTE, a PDCCH can be transmitted in a control region that is not shared with a PDSCH in the frequency domain. When EPDCCH was introduced, commonality with PDCCH was maintained whenever possible. However, for sPDCCH and NR-PDCCH, the control channel design can be made compatible with characteristics of PDSCH resource allocation whenever possible and the need to maintain commonality with LTE PDCCH may not be that strong.

For example, if PDSCH resource allocation based on RBGs is supported, such as similar to LTE Resource Aggregation (RA) Type 0 and 1 in LTE, then CCE size and aggregation levels supported for sPDCCH/NR-PDCCH can be chosen such that the size of control channel candidates and RBG size used for PDSCH evenly divide, such as by multiple or sub-multiple, with each other as much as possible.

To elaborate on this example, if RBG size of 3 RBs is used for PDSCH, such as similar to a 10 MHz Bandwidth (BW) case for LTE, a CCE size/aggregation level combination that results in PDCCH candidates spanning n*3 RBs may provide a better reuse of PDCCH to PDSCH resources than a CCE size of 4 REGs/RBs and aggregation level L=1, 2, 4, and 8. Allowing for such considerations, such as choosing CCE size and/or aggregation levels based on RBG size of PDSCH, NR-PDCCH design can be made more elaborate than LTE and the number of options can be limited to control implementation complexity.

Figure 2:
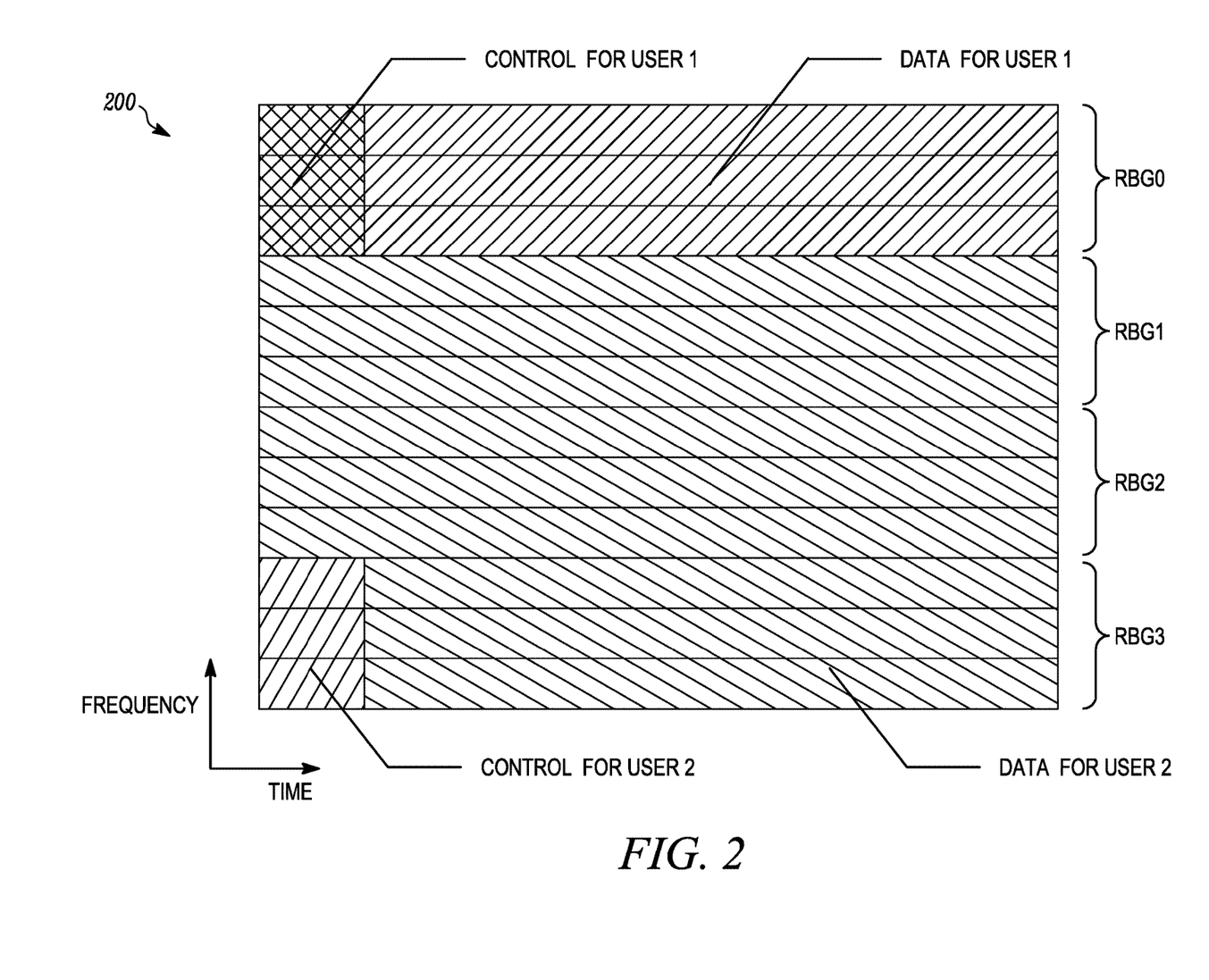
FIGS. 2 and 3 are example illustrations of scheduling user data according to possible embodiments.
Figure 3:
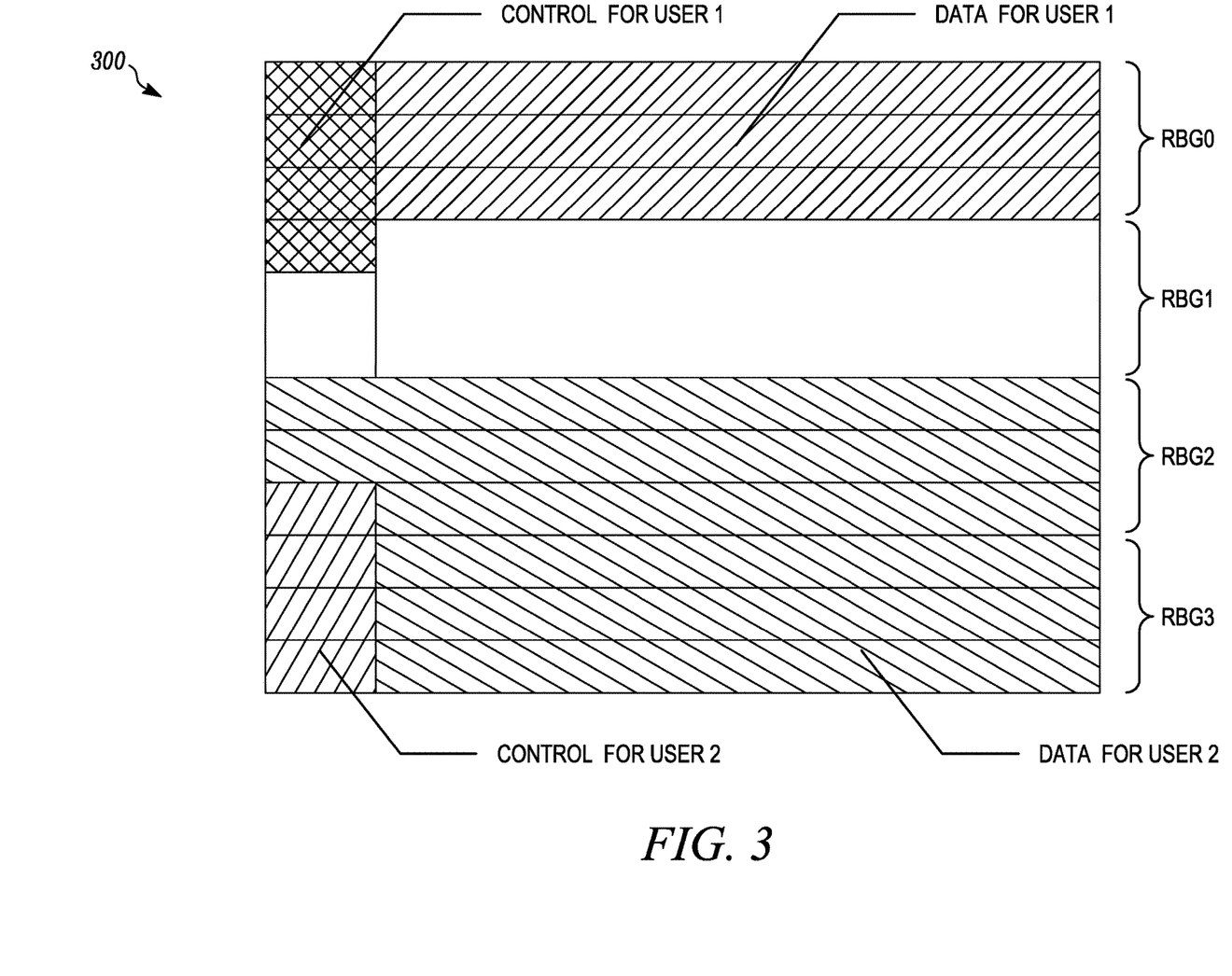

FIGS. 2 and 3 are example illustrations 200 and 300 of scheduling user data according to possible embodiments. In the illustration 200, user1 has data to be scheduled in one RBG: RBG0, while user2 has data to be scheduled in three RBGs: RBG1, RBG2, and RBG3. Data allocation for user2 also uses resources in the OFDM symbols used for control channel transmission. The CCE size of three RBs and the aggregation level can be chosen such that the control channel transmission for user1 and user2 are aligned with RBG boundaries.

In the illustration 300 the CCE size and aggregation level can be chosen such that control channel transmission for user1 and user2 are not aligned with RBG boundaries. The RBG1 may not be allocated to user2 since the control channel for user1 is not limited to subcarriers corresponding to RBG0 but is also transmitted in subcarriers corresponding to RBG1 resulting in unused resources. The data for user2 that could have been sent in RBG1 can now be sent in a later slot/subframe, which may result in degraded performance for user2.

The illustrations 200 and 300 show data allocation within a subframe/slot, where a slot can be a short Transmit Time Interval (sTTI), such as two, three, or seven symbols, that is shorter than a subframe TTI. In some cases, such as sPDCCH scheduling of short PDSCH (sPDSCH), data allocation can be in the same OFDM symbols used for control. The sPDCCH and sPDSCH can correspond to a sTTI.

The implementations discussed above can be addressed by using the following example designs. While the example describes sPDCCH and sPDSCH reuse, similar principles can be used for NR-PDCCH and NR-PDSCH reuse in the same OFDM symbol.

According to a possible embodiment, a set up can be used for PDSCH RBG size of 3 RBs, such as a 10 MHz system BW case in LTE. According to this embodiment, the RBG size can be 3 RBs. The sRBG size can be 2 RBGs=6 RBs, where there can be 9 sRBGs in the overall BW, where the last sRBG can be smaller than the others. The sPDSCH can be allocated with sRBG granularity. One CCE can be 1 REG. One REG can be 1 RB spanning two OFDM symbols. The sPDCCH can be allocated using aggregation levels L=2, 3, and 6 CCEs. If a UE detects a Downlink (DL) assignment in a sRBG, it can assume that all RBs in the sRBG following the detected DL assignment are assigned for that UE. Any UL grants can precede the DL assignment in the sRBG. There may be no need to specify this and it can be handled by scheduler. Given this, if there are UEs with only DL assignment or UEs with an UL grant and DL assignments, or if there are UL grants for a set of UEs and DL assignments for another set of UEs, then no holes, such as unallocated control resources that cannot be used for data transmission, may be created. Holes may be created when there are more UL grants than DL assignments or when the UL grant and DL assignment cannot be sent in same sRBG due to search space restrictions. Holes may not need to be minimized for this aspect, as the minimization of holes can be handled by the scheduler for most cases.

For example, consider a 10 MHz BW where sRBGs can be 1-9. UEs can be configured with 2 sets of sRBGs: s1 (sRBG1, sRBG4, and sRBG7) and s2 (sRBG2, sRBG5, and sRBG8) for monitoring the sPDCCH. sRBGs 3, 6, and 9 can be used for other purposes such as data transmission, like sPDSCH. Some UEs can be configured with a first sPDCCH control resource set configuration, and can monitor sPDCCH as follows: for L=2 CCE, two sPDCCH candidates within the 1st control resource set s1 and one sPDCCH candidate within the 2nd control resource set s2 (3 candidates in total) can be monitored; for L=3 CCE, one sPDCCH candidate within the 1st control resource set s1 and one sPDCCH candidate within the 2nd control resource set s2 (2 candidates in total) can be monitored; and for L=6 CCE, one sPDCCH candidate within the 1st control resource set s1 (1 candidate in total) can be monitored. Some other UEs can be configured with a second sPDCCH control resource set configuration, and monitor sPDCCH as follows: for L=2 CCE, one sPDCCH candidate within the 1st control resource set s1 and 2 sPDCCH candidates within the 2nd control resource set s2 (3 candidates in total) can be monitored; for L=3 CCE, one sPDCCH candidate within the 1st control resource set s1 and one sPDCCH candidate within the 2nd control resource set s2 (2 candidates in total) can be monitored; and for L=6 CCE, one sPDCCH candidate within the 2nd control resource set s2 (1 candidate) can be monitored. No holes, such as non-allocable resources, may be created corresponding to an sPDCCH candidate with L=6CCEs since the entire sRBG is used, such as when all 6 CCEs are mapped to a single sRBG. For smaller aggregation levels the candidates can be spread in the sets so a scheduler can pick an appropriate set to avoid holes for most cases.

According to another possible embodiment, a set up can be used for PDSCH RBG size of 4 RBs, such as a 20 MHz system BW case in LTE. According to this embodiment, the RBG size can be 4 RBs. The sRBG size can be 2 RBGs=8 RBs. There can be 13 sRBGs in the overall BW, where the last sRBG can be smaller than the others. The sPDSCH can be allocated with sRBG granularity. One CCE can be 1 REG=1 RB. The sPDCCH can be allocated using aggregation levels L=2, 4, and 8 CCEs. The aggregation levels can result in more REs compared to 10 MHz. This can be partially compensated for by a larger DCI payload for 20 MHz.

From a sPDCCH monitoring perspective, the fractional/smaller sRBG, such as the 9th sRBG for 10 MHz and the 13th sRBG for 20 MHz, which can be the sRBG located towards one of the channel edges, can be handled by simply appending it as an extra control channel candidate to the preceding sRBG or a set s2. Thus, for 10 MHz, the 9th sRBG can create an extra L=2 candidate for the 8th sRBG. Also, for 20 MHz, the 13th sRBG can create an extra L=4 candidate for the 12th sRBG. The fractional sRBG can be included in one of the configured sets, where which configured set it is included in can be indicated to the UE during set configuration or based on a predefined rule. The fractional sRBG can also provide additional CCEs for some of the control channel candidates. For example, a 6 CCE candidate for 10 MHz can become an 8 CCE candidate with the 2 extra CCEs from the fractional sRBG.

According to possible embodiments, user data, such as in the PDSCH, can be allocated in groups of resource blocks, such as RBGs. Control signals, such as in sPDCCH/NR-PDCCH, can be transmitted using CCEs where each CCE can correspond to one or more REGs. Each RE can correspond to one subcarrier in one OFDM symbol. Data and control can be transmitted in same OFDM symbol. The CCE size, C, used for control transmission can be determined based on the RBG size used for data scheduling. Similarly, the aggregation levels, $L \in \{L1, L2 \ldots\}$, at which control channel candidates are monitored can be determined based on the RBG size used for data scheduling. A control channel candidate at aggregation level L can correspond to L CCEs with each CCE having CCE size C. The RBG size can be determined based on system bandwidth or it can be configured via higher layers. The dependence of CCE size and/or aggregation level need not be present for monitoring all types of control channel candidates. For example, to monitor candidates belonging to a common search space or a common control resource set, such as control used for system information scheduling, paging indication, RACH response indication, etc., the UE can use a default CCE size and default set of aggregation levels. The CCE size and/or aggregation level can be part of a higher layer message. The higher layer message can also configure the RBG size for data scheduling. Control and data can be sent in the same OFDM symbol of a slot/subframe. A slot/subframe can correspond to multiple OFDM symbols, such as 2, 7, or 14 OFDM symbols.

Figure 4:
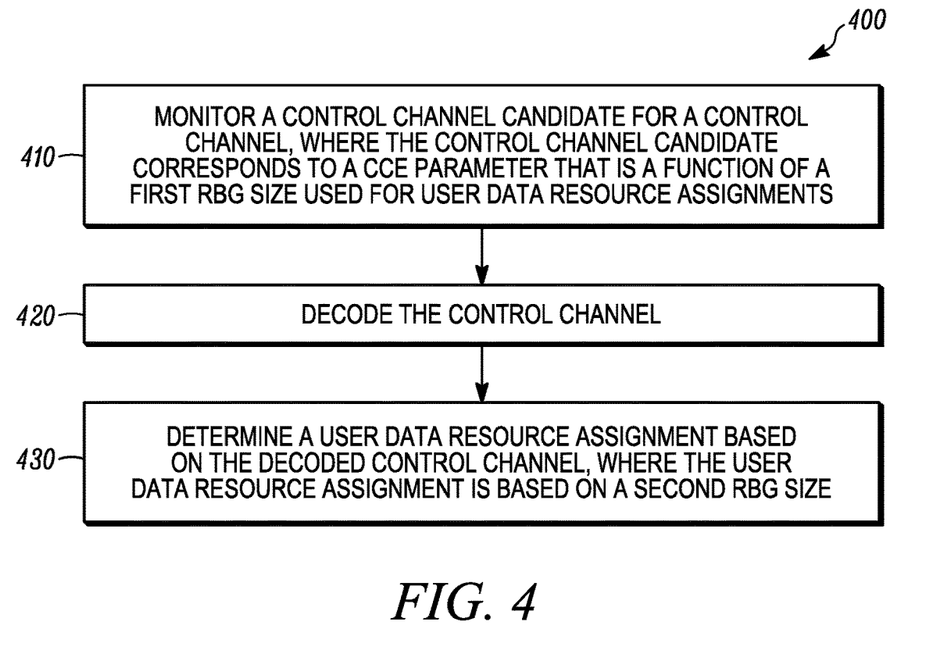
FIG. 4 is an example flowchart illustrating the operation of a wireless communication device according to a possible embodiment.

FIG. 4 is an example flowchart 400 illustrating the operation of a wireless communication device, such as the UE 110, according to a possible embodiment. At 410, a control channel candidate for a control channel can be monitored. Monitoring the control channel candidate can imply attempting to decode the control channel candidate. The control channel candidate can correspond to a CCE parameter that can be a function of a first RBG size used for user data resource assignments. The first RBG size can be for a rRBG that corresponds to a regular TTI or a sRBG that corresponds to a shorter TTI that is shorter in length than the regular TTI. A RBG can be used as resource allocation unit via a DL data assignment. An RBG can include multiple RBs. The RBG size in number of RBs can be determined as a function of system bandwidth, bandwidth configuration, or other information.

The CCE parameter can be a CCE size. The CCE size can be a function of the first RBG size used for user data resource assignments. The control channel candidate can correspond to the CCE size. For example, the CCE size can be a function of a number REGs in the CCE and a REG size can be based on a number of REs in the REG. The CCE size, such as in number of REGs, can be a multiple or a submultiple of an RBG size. The CCE size can be in the frequency domain. Also, the first RBG size can be a number, K, of times the CCE size. The number K can be a positive integer value. For example, the CCE size can be a multiple of the RBG size. Additionally, the CCE size can be a number M of times the first RBG size. The number M can be a positive integer value. For example, the RBG size can be a multiple of the CCE size.

The CCE parameter can also be a set of CCE aggregation levels. An aggregation level can be based on the number of CCE's in a PDCCH. For example, a control channel candidate with aggregation level L can include L CCEs. The control channel candidate can correspond to the set of CCE aggregation levels. The set of CCE aggregation levels can be a function of the first RBG size used for user data resource assignments. In this implementation, the CCE size can be set irrespective to RBG size, but the set of CCE aggregation levels can be set based on RBG size and CCE size.

The control channel candidate can be a first control channel candidate. The CCE parameter can be a first CCE parameter. A second control channel candidate corresponding to a second CCE parameter can be monitored. The second CCE parameter may not be a function of the first RBG size used for data resource assignments. As indicated above, the CCE parameter can be a CCE size or a CCE aggregation level.

The UE can be configured with control resource sets including a first set of the control resource sets and a second set of the control resource sets. Each control resource set in the first set of the control resource sets can include a plurality of RBGs of a third RBG size. The third RBG size can be either the first RBG size or the second RBG size. The second set of the control resource sets can include at least one RBG of a fourth RBG size. The fourth RBG size can be smaller than the third RBG size. Which configured control resource set the fourth sized RBG is included in can be determined according to an indication received by the UE or according to a predefined rule.

At 420, the control channel can be decoded. The control channel candidate can be decoded based on a first DMRS pattern and a first REG-to-CCE mapping when the control channel candidate is received in one symbol control channel. The control channel candidate can be decoded based on a second DMRS pattern and a second REG-to-CCE mapping when the control channel candidate is received in more than one symbol control channel REGs can be first frequency mapped to CCEs before the REGs are time mapped to CCEs in the first REG-to-CCE mapping. REGs can be first time mapped to CCEs before the REGs are frequency mapped to CCEs in the second REG-to-CCE mapping. CCEs can be first frequency mapped to search space candidates before the CCEs are time mapped to search space candidates. The second DMRS pattern can be different from the first DMRS pattern.

At 430, a user data resource assignment can be determined based on the decoded control channel. The user data resource assignment can be based on a second RBG size. The second RBG size can be for sRBG. The determined user data resource assignment can allocate resource blocks in multiples of RBGs of the second RBG size. The determined user resource assignment can be different from the user data resource assignments for the CCE parameter corresponding to the first RBG size. The user data resource assignments for the CCE parameter can be for different TTI lengths, such as rTTI and sTTI lengths that are different from each other. The determined data resource assignment can be for a sTTI length.

The first RBG size can be the same as the second RBG size. Alternately, the second RBG size can be a multiple of the first RBG size. For example, the first RBG size can be used for a user data resource assignment associated with a first TTI duration. The second RBG size can be used for a user data resource assignment associated with a second TTI duration. The second TTI duration can be smaller than the first TTI duration. The first and second RBG sizes can be determined based on a DL system BW or a DL channel BW configuration. There can be a table that indicates which RBG size should be used for a given DL system BW or given DL channel BW. At least one of the first and second RBG sizes can also be determined from a higher layer message. The higher layer can be a layer higher than a physical layer. The higher layer can be a RRC layer, a MAC layer, or any other layer higher than a physical layer.

The CCE parameter can be a CCE aggregation level of a control channel candidate at least mapped to REGs occupying REs corresponding to at least one RBG with a third RBG size. The third RBG size can be smaller than the second RBG size. The CCE aggregation level of the control channel candidate can be determined based on the second RBG size and the third RBG size. A CCE aggregation level of another control channel candidate mapped to REGs occupying REs other than those corresponding to the at least one RBG can be determined based on the second RBG size. For example, a fractional sRBG can also provide additional CCEs for some of the control channel candidates. As a further example, a 6 CCE candidate for 10 MHz can become an 8 CCE candidate with the two extra CCEs from the fractional sRBG.

User data can be sent on a data channel whereas control signals can be sent on a control channel User data can include at least one transport block that is transmitted on at least one data channel Control channels and user data can be received in the same OFDM symbol. A user data packet can be segmented into at least one transport block.

Figure 5:
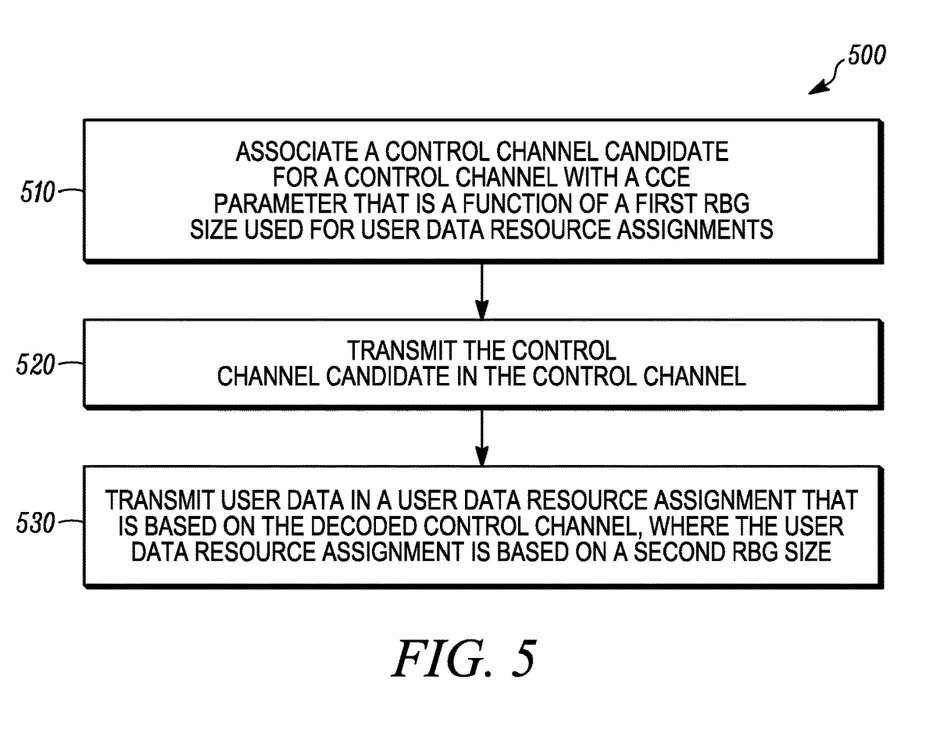
FIG. 5 is an example flowchart illustrating the operation of a wireless communication device according to a possible embodiment.

FIG. 5 is an example flowchart 500 illustrating the operation of a wireless communication device, such as the network entity 120, according to a possible embodiment. At 510, a control channel candidate for a control channel can be associated with a CCE parameter that is based on a first RBG size used for user data resource assignments.

At 520, the control channel candidate can be transmitted in the control channel. The control channel candidate can be a first control channel candidate. The CCE parameter can be a first CCE parameter. A second control channel candidate corresponding to a second CCE parameter can be transmitted. The second CCE parameter may not be a function of the first RBG size used for data resource assignments.

The CCE parameter can be a CCE size. The control channel candidate can correspond to the CCE size. The CCE size can be a function of the first RBG size used for user data resource assignments. The first RBG size can be a number, K, of times the CCE size. The number K can be a positive integer value. The CCE size can be a number, M, of times the first RBG size. The number M can be a positive integer value. The CCE parameter can also be a set of CCE aggregation levels. The set of CCE aggregation levels can be a function of the first RBG size used for user data resource assignments. The control channel candidate can correspond to the set of CCE aggregation levels.

At 530, user data can be transmitted in a user data resource assignment that is based on the control channel. The user data resource assignment can allocate resource blocks in multiples of RBGs of the second RBG size. The user data resource assignment can be a function of a second RBG size.

The first RBG size can be the same as the second RBG size. The second RBG size can also be a multiple of the first RBG size. The first RBG size can be used for a user data resource assignment associated with a first TTI duration. The second RBG size can be used for a user data resource assignment associated with a second TTI duration. The second TTI duration can be smaller than the first TTI duration. The first and second RBG sizes can be determined based on a downlink system bandwidth or a downlink channel bandwidth configuration. A higher layer message that indicates at least one of the first and second RBG sizes can be sent. The higher layer can be a layer higher than a physical layer.

A UE the control channel is transmitted to can be configured with control resource sets including a first set of the control resource sets and a second set of the control resource sets. Each control resource set in the first set of the control resource sets can include a plurality of RBGs of a third RBG size. The third RBG size can be either the first RBG size or the second RBG size. The second set of the control resource sets can include at least one RBG of a fourth RBG size. The fourth RBG size can be smaller than the third RBG size. The UE can determine which configured control resource set the fourth sized RBG is included in according to an indication sent to the UE or according to a predefined rule.

The control channel candidate can include CCEs that include REGs. The control channel candidate can be based on a first DMRS pattern and a first REG-to-CCE mapping when the control channel candidate is received in one symbol control channel. The control channel candidate can be based on a second DMRS pattern and a second REG-to-CCE mapping when the control channel candidate is received in more than one symbol control channel REGs can be first frequency mapped to CCEs before the REGs are time mapped to CCEs in the first REG-to-CCE mapping. REGs can be first time mapped to CCEs before the REGs are frequency mapped to CCEs in the second REG-to-CCE mapping. CCEs can be first frequency mapped to search space candidates before the CCEs are time mapped to search space candidates. The second DMRS pattern can be different from the first DMRS pattern.

The CCE parameter can be a CCE aggregation level of a control channel candidate at least mapped to REGs occupying REs corresponding to at least one RBG with a third RBG size. The third RBG size can be smaller than the second RBG size. The CCE aggregation level of the control channel candidate can be determined based on the second RBG size and the third RBG size. A CCE aggregation level of another control channel candidate mapped to REGs occupying REs other than those corresponding to the at least one RBG can be determined based on the second RBG size. For example, a fractional sRBG can also provide additional CCEs for some of the control channel candidates. As a further example, a 6 CCE candidate for 10 MHz can become an 8 CCE candidate with the 2 extra CCEs from the fractional sRBG.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
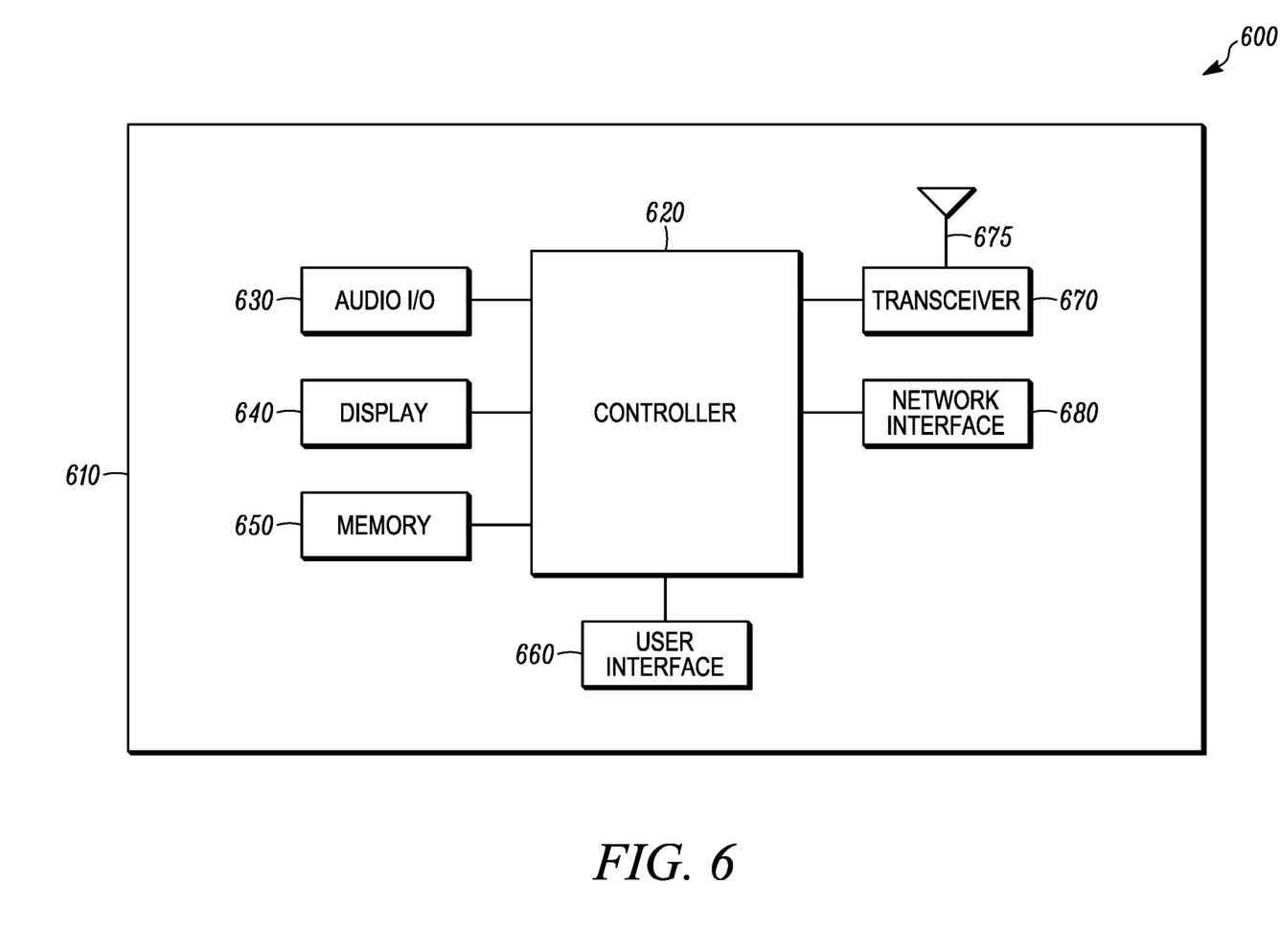
FIG. 6 is an example block diagram of an apparatus according to a possible embodiment

FIG. 6 is an example block diagram of an apparatus 600, such as the UE 110, the network entity 120, or any other wireless communication device disclosed herein, according to a possible embodiment. The apparatus 600 can include a housing 610, a controller 620 coupled to the housing 610, audio input and output circuitry 630 coupled to the controller 620, a display 640 coupled to the controller 620, a transceiver 670 coupled to the controller 620, at least one antenna 675 coupled to the transceiver 670, a user interface 660 coupled to the controller 620, a memory 650 coupled to the controller 620, and a network interface 680 coupled to the controller 620. The apparatus 600 may not necessarily include all of the illustrated elements for different embodiments of the present disclosure. The apparatus 600 can perform the methods described in all the embodiments.

The display 640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 670 can be at least one or more transceivers that can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, multiple user interfaces, or any other device useful for providing an interface between a user and an electronic device. The network interface 680 can be a Universal Serial Bus (USB) port, an Ethernet port, an infrared transmitter/receiver, an IEEE 1394 port, a WLAN transceiver, or any other interface that can connect an apparatus to a network, device, and/or computer and that can transmit and receive data communication signals. The memory 650 can include a Random Access Memory (RAM), a Read Only Memory (RON), an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 650 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

In operation according to a possible embodiment where the apparatus 600 can be a UE, the transceiver 670 can monitor a control channel candidate for a control channel. The control channel candidate can correspond to a CCE parameter that is a function of a first RBG size used for user data resource assignments. The control channel candidate can be a first control channel candidate. The CCE parameter can be a first CCE parameter. The transceiver 670 can monitor a second control channel candidate corresponding to a second CCE parameter. The second CCE parameter may not be a function of the first RBG size used for data resource assignments.

The controller 620 can decode the control channel. The controller 620 can determine a user data resource assignment based on the decoded control channel. The user data resource assignment can be based on a second RBG size. The second RBG size can be a multiple of the first RBG size. The first RBG size can be used for a user data resource assignment associated with a first TTI duration. The second RBG size can be used for a user data resource assignment associated with a second TTI duration. The second TTI duration can be smaller than the first TTI duration.

The apparatus 600 can be configured with control resource sets including a first set of the control resource sets and a second set of the control resource sets. Each control resource set in the first set of the control resource sets can include a plurality of RBGs of a third RBG size. The second set of the control resource sets can include at least one RBG of a fourth RBG size. The fourth RBG size can be smaller than the third RBG size. The controller 620 can determine which configured control resource set the fourth sized RBG is included in according to an indication received by the UE or according to a predefined rule.

According to another possible embodiment where the apparatus 600 can be a network entity, the controller 620 can associate a control channel candidate for a control channel with a CCE parameter that is based on a first RBG size used for user data resource assignments. The first RBG size can be used for a user data resource assignment associated with a first TTI duration. The transceiver 670 can transmit the control channel candidate in the control channel. The transceiver 670 can transmit user data in a user data resource assignment that is based on the control channel. The user data resource assignment can be a function of a second RBG size. The second RBG size can be a multiple or submultiple of the first RBG size. The second RBG size can be used for a user data resource assignment associated with a second TTI duration. The second TTI duration can be smaller than the first TTI duration.

The control channel candidate can be a first control channel candidate. The CCE parameter can be a first CCE parameter. The transceiver 670 can transmit a second control channel candidate corresponding to a second CCE parameter. The second CCE parameter may not be a function of the first RBG size used for data resource assignments.

A UE the control channel candidate is transmitted to can be configured with control resource sets including a first set of the control resource sets and a second set of the control resource sets. Each control resource set in the first set of the control resource sets can include a plurality of RBGs of a third RBG size. The second set of the control resource sets can include at least one RBG of a fourth RBG size. The fourth RBG size can be smaller than the third RBG size. The UE can determine which configured control resource set the fourth sized RBG is included in according to an indication sent to the UE or according to a predefined rule.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
   monitoring, by the user equipment, a control channel candidate for a control channel, where the control channel candidate corresponds to a control channel element parameter that is a function of a first resource block group size used for user data resource assignments;
   decoding the control channel; and
   determining a user data resource assignment based on the decoded control channel, where the user data resource assignment is based on a second resource block group size,
   wherein the control channel element parameter comprises a control channel element size,
   wherein the control channel candidate corresponds to the control channel element size, where the control channel element size is a function of the first resource block group size used for user data resource assignments, and
   wherein the first resource block group size is a number, K, of times the control channel element size, and the number K is a positive integer value.

2. The method according to claim 1, wherein the first resource block group size is the same as the second resource block group size.

3. The method according to claim 1, wherein the second resource block group size is a multiple of the first resource block group size.

4. The method according to claim 3,
wherein the first resource block group size is used for a user data resource assignment associated with a first transmit time interval duration,
wherein the second resource block group size is used for a user data resource assignment associated with a second transmit time interval duration, and
wherein the second transmit time interval duration is smaller than the first transmit time interval duration.

5. The method according to claim 1,
wherein the control channel element parameter comprises a set of control channel element aggregation levels, where the set of control channel element aggregation levels is a function of the first resource block group size used for user data resource assignments, and
wherein the control channel candidate corresponds to the set of control channel element aggregation levels.

6. The method according to claim 1, further comprising determining the first and second resource block group sizes based on a downlink system bandwidth or a downlink channel bandwidth configuration.

7. The method according to claim 1, further comprising determining at least one of the first and second resource block group sizes from a higher layer message where the higher layer is a layer higher than a physical layer.

8. The method according to claim 1,
wherein the control channel candidate is a first control channel candidate,
wherein the control channel element parameter is a first control channel element parameter, and
wherein the method further comprises monitoring a second control channel candidate corresponding to a second control channel element parameter where the second control channel element parameter is not a function of the first resource block group size used for data resource assignments.

9. The method according to claim 1, wherein the user data resource assignment allocates resource blocks in multiples of resource block groups of the second resource block group size.

10. The method according to claim 1,
wherein the control channel element parameter is a control channel element aggregation level of a control channel candidate at least mapped to resource element groups occupying resource elements corresponding to at least one resource block group with a third resource block group size,
wherein the third resource block group size is smaller than the second resource block group size,
wherein the control channel element aggregation level of the control channel candidate is determined based on the second resource block group size and the third resource block group size, and
wherein a control channel element aggregation level of another control channel candidate mapped to resource element groups occupying resource elements other than those corresponding to the at least one resource block group is determined based on the second resource block group size.

11. The method according to claim 1,
wherein the user equipment is configured with control resource sets including a first set of the control resource sets and a second set of the control resource sets,
wherein each control resource set in the first set of the control resource sets includes a plurality of resource block groups of a third resource block group size,
wherein the second set of the control resource sets includes at least one resource block group of a fourth resource block group size,
wherein the fourth resource block group size is smaller than the third resource block group size, and
wherein the method further comprises determining which configured control resource set the fourth sized resource block group is included in according to an indication received by the user equipment or according to a predefined rule.

12. The method of claim 11, wherein the third resource block group size is either the first resource block group size or the second resource block group size.

13. The method according to claim 1,
wherein the control channel candidate includes control channel elements that include resource element groups,
wherein decoding comprises decoding the control channel candidate based on
a first demodulation reference signal pattern and
a first resource element group-to-control channel element mapping
based on the control channel candidate being received in one symbol control channel,
wherein decoding comprises decoding the control channel candidate based on
a second demodulation reference signal pattern and
a second resource element group-to-control channel element mapping
based on the control channel candidate being received in more than one symbol control channel,
wherein resource element groups are first frequency mapped to control channel elements before the resource element groups are time mapped to control channel elements in the first resource element group-to-control channel element mapping,
wherein resource element groups are first time mapped to control channel elements before the resource element groups are frequency mapped to control channel elements in the second resource element group-to-control channel element mapping,
wherein control channel elements are first frequency mapped to search space candidates before the control channel elements are time mapped to search space candidates,
wherein the second demodulation reference signal pattern is different from the first demodulation reference signal pattern.

14. An apparatus comprising:
a transceiver that monitors a control channel candidate for a control channel, where the control channel candidate corresponds to a control channel element parameter that is a function of a first resource block group size used for user data resource assignments; and
a controller coupled to the transceiver, where the controller
decodes the control channel; and
determines a user data resource assignment based on the decoded control channel, where the user data resource assignment is based on a second resource block group size,
wherein the control channel element parameter comprises a control channel element size,
wherein the control channel candidate corresponds to the control channel element size, where the control channel element size is a function of the first resource block group size used for user data resource assignments, and wherein the first resource block group size is a number, K, of times the control channel element size, and the number K is a positive integer value.

15. The apparatus according to claim 14,
wherein the second resource block group size is a multiple of the first resource block group size,
wherein the first resource block group size is used for a user data resource assignment associated with a first transmit time interval duration,
wherein the second resource block group size is used for a user data resource assignment associated with a second transmit time interval duration, and
wherein the second transmit time interval duration is smaller than the first transmit time interval duration.

16. The apparatus according to claim 14,
wherein the control channel candidate is a first control channel candidate,
wherein the control channel element parameter is a first control channel element parameter, and
wherein the transceiver monitors a second control channel candidate corresponding to a second control channel element parameter where the second control channel element parameter is not a function of the first resource block group size used for data resource assignments.

17. The apparatus according to claim 14,
wherein the apparatus is configured with control resource sets including a first set of the control resource sets and a second set of the control resource sets,
wherein each control resource set in the first set of the control resource sets includes a plurality of resource block groups of a third resource block group size,
wherein the second set of the control resource sets includes at least one resource block group of a fourth resource block group size,
wherein the fourth resource block group size is smaller than the third resource block group size, and
wherein the controller determines which configured control resource set the fourth sized resource block group is included in according to an indication received by the user equipment or according to a predefined rule.

* * * * *